United States Patent [19]
Bin-Taleb et al.

[11] Patent Number: 6,124,412
[45] Date of Patent: Sep. 26, 2000

[54] ALUMOXANE-ENHANCED, SUPPORTED ZIEGLER-NATTA POLYMERIZATION CATALYSTS, METHODS OF MAKING SAME, PROCESSES OF USING SAME AND POLYMERS PRODUCED THEREFROM

[75] Inventors: Abdulmalik Bin-Taleb; Raju Raghavan, both of Riyadh; Abdulwhab Al-Sadoon, Doha-Qatar, all of Saudi Arabia

[73] Assignee: Saudi Basic Industries Corporation, Saudi Arabia

[21] Appl. No.: 08/999,049

[22] Filed: Dec. 29, 1997

[51] Int. Cl.⁷ .................... B01J 31/00; B01J 4/44
[52] U.S. Cl. ............... 526/159; 526/124.2; 526/124.3; 526/124.9; 526/129; 526/165; 502/103; 502/104; 502/113; 502/114; 502/115; 502/116; 502/117; 502/118; 502/125; 502/126
[58] Field of Search ............... 502/113, 115, 502/116, 103, 104, 114, 117, 118, 125, 126; 526/124.2, 124.3, 124.9, 129, 159, 165

[56] References Cited

U.S. PATENT DOCUMENTS

| | | | |
|---|---|---|---|
| 4,124,532 | 11/1978 | Giannini et al. | |
| 4,302,566 | 11/1981 | Karol et al. | 526/125 |
| 4,303,771 | 12/1981 | Wagner et al. | 526/125 |
| 4,701,432 | 10/1987 | Welborn, Jr. | 502/113 |
| 5,122,584 | 6/1992 | Takahashi | 526/125 |
| 5,183,867 | 2/1993 | Welborn, Jr. | 526/114 |
| 5,442,019 | 8/1995 | Agapiou et al. | 526/82 |
| 5,672,665 | 9/1997 | Agapiou et al. | 526/82 |
| 5,747,612 | 5/1998 | Agapiou et al. | 526/82 |
| 5,753,786 | 5/1998 | Agapiou et al. | 526/82 |

*Primary Examiner*—Elizabeth D. Wood
*Attorney, Agent, or Firm*—William J. Spatz; John E. Boyd

[57] ABSTRACT

The present invention relates to a new olefin polymerization catalyst composition, and methods of preparing and methods of using the catalysts to polymerize various olefinic monomers in either gas or slurry phase reactions. The principal advance over the previous art of record involves using alumoxanes or combinations of alumoxanes as catalyst preactivators. Polymers prepared from these catalysts posses productivity increased as high as 40 percent. At the same time, the bulk density remains relatively constant. Additionally, the total amount of cocatalyst species needed to effectively practice the invention is relatively low.

57 Claims, No Drawings

ALUMOXANE-ENHANCED, SUPPORTED ZIEGLER-NATTA POLYMERIZATION CATALYSTS, METHODS OF MAKING SAME, PROCESSES OF USING SAME AND POLYMERS PRODUCED THEREFROM

CROSS-REFERENCE TO RELATED APPLICATIONS

Reference is made to copending U.S. application Ser. No. 08/999,035 filed Dec. 29, 1997, incorporated herein by reference.

BACKGROUND OF THE INVENTION

1. Field of the Invention

The invention relates to supported modified Ziegler-Natta type transition-metal based catalysts, methods for making the same, methods of using the same and polymeric products obtained therefrom.

2. Description of the Related Art

Several publications are referenced in this application. These references describe the state of the art to which this invention pertains, and are incorporated herein by reference.

The field of olefin catalysis has witnessed many remarkable discoveries during the last 50 years. In particular, two broad areas of invention having exceptional industrial importance stand out. First, in the 1950's the Ziegler-type catalysts were discovered and exploited in a variety of applications. Even today, these catalyst systems are used in many commercially important operations. Secondly, and more recently, the discovery of the "Metallocene"-type transition metal catalysts which are prepared with various cyclopentadiene and substituted cyclopentadiene derivatives have provided another important advance in polyolefin research and commercial products.

However, both of these important discoveries have certain limitations as known to those of ordinary skill in the art. Traditional Ziegler-Natta (hereafter referred to as Z-N) catalysts suffer from limited productivity, meaning the efficiency of conversion from monomer to polymer per unit of catalyst consumed is low. One method which has been attempted to enhance the productivity of traditional Z-N catalysts involves the pre-treatment or pre-activation of certain transition metal catalyst compositions using conventional aluminum alkyls.

In contrast, the metallocene-type catalysts possess extremely high rates of productivity. However, many commercial plants are not able to use such high levels of productivity and refitting such plants would be prohibitively expensive. Often, the amount of polymer produced is in excess of the down stream equipment's ability to process the product. Finally, large amounts of expensive alumoxane cocatalysts are required to initiate and sustain metallocene-based polymerizations. Consequently, these types of catalyst systems are sometimes modified by the addition of traditional Z-N catalysts (non-metallocene-type catalysts) to reduce the rates of productivity and thereby modify the properties of polymers produced to yield useful commercial products. These modifications are suggested to improve the molecular weight distributions and physical properties of polymers produced using these catalysts.

Thus, there appears to be an unmet, unfilled need in the field of olefin transition metal catalyst polymerization wherein the productivity or efficiency of the catalysts could be economically improved without compromising the useful characteristics of the resultant materials. More specifically, the improvements in productivity would mean that less catalyst is consumed thus resulting in significant economic savings in costs associated with producing a given quantity of polymer.

U.S. Pat. Nos. 4,701,432 and 5,183,867 to Welborn, Jr., et al., relate to supported olefin polymerization catalysts and processes of using same. These catalysts may contain at least one metallocene of a metal of Group IVB, VB, and VIB of the Periodic table, a non-metallocene transition metal-containing compound of a Group IVB, VB, or VIB metal and an alumoxane, the catalytic product being formed in the presence of the support. The catalyst is useful for the polymerization of olefins, especially ethylene and especially for the copolymerization of ethylene and other mono and diolefins. More specifically, the patents describe supported olefin catalyst systems wherein the catalyst components consist of a metallocene, a nonmetallocene transition metal component, an alumoxane and optionally, a cocatalyst system of an organic compound of a metal of Groups I-III of the Periodic Table, known to those skilled in the art as aluminum alkyls.

U.S. Pat. No. 5,183,867 to Welborn also relates to a two component transition metal complex for preparing polymers having multimodal molecular weight distributions (MWD).

U.S. Pat. No. 4,303,771 to Wagner et al. relates to a catalytic process for preparing ethylene polymers having a density between about 0.94 and 0.97 and a melt flow ratio of between about 22 and 32. The polymers are prepared in a low pressure reactor at a productivity of greater than or equal to 50,000 lbs of polymer per pound of Ti. The process uses a catalyst formed from selected organoaluminum compounds and a precursor composition being the reaction product of $TiCl_3$, $MgCl_2$, and THF as an electron donor (ED) compound in specific ratios. The aluminum alkyl is used as a "partially activating" agent before the catalyst is introduced into the reactor.

U.S. Pat. No. 4,302,566 to Karol et al. relates to the preparation of transition metal catalysts diluted with an inert carrier material and formed with selected organo aluminum compounds. Additionally, the Karol patent teaches specific activation sequences for the catalytic entities.

U.S. Pat. No. 4,124,532 to Giannini et al. describes the usefulness of incorporating various alkali and alkali earth metal complexes, e.g. $MgCl_2$, into olefinic transition metal polymerization catalysts. These complexes are taught as having a positive effect on the activity of the polymerization of ethylene and alpha-olefins while being generally much less active than the corresponding transition metal halides.

It would be advantageous to provide a catalyst for olefin polymerizations having a useful range of productivity which is greater than that of a typical Z-N catalyst while less than that of many metallocene systems. It would be further useful to, at the same time, improve various physical properties of the polymers produced, e.g. molecular weight distributions and bulk density. Still another advantage would be improved flexibility in choosing the combinations of co-catalyst systems useful to preactivate and then activate the catalyst systems, while maintaining or improving the productivity and physical properties of the resultant polymers and copolymers.

None of the above-identified patents teach or suggest the beneficial effects of deliberate sequences of pre-activation and subsequent full activation of the catalysts using either alumoxanes alone or in conjunction with traditional aluminum alkyl type transition metal polymerization activators.

OBJECTS OF THE INVENTION

It is an object of the invention to overcome the above-identified deficiencies.

It is another object of the invention to provide a catalyst for use in olefin polymerizations having a useful, improved range of productivity.

It is a further object of the invention to provide a method of making improved catalysts for use in olefin polymerizations.

It is a still further object of the invention to provide methods of making improved polymer products from olefin polymerizations having improved physical properties including improved molecular weight distributions and/or bulk density, and methods of making the same.

The foregoing and other objects and advantages of the invention will be set forth in or apparent from the following description.

SUMMARY OF THE INVENTION

The invention relates to improved supported modified Ziegler-Natta type transition-metal based catalysts, methods for making the same, methods of using the same and polymeric products obtained therefrom. The inventors have discovered, unexpectedly and surprisingly, novel catalyst systems and processes for the polymerization of olefinic monomers, particularly ethylene, and copolymers with various comonomers such as propylene, 1-butene, 1-pentene, 1-hexene, 1-octene, 4-methyl pentene and the like. The novel catalysts have an improved catalytic productivity over many conventional Z-N catalyst systems while meeting the other required characteristics of such catalysts. The activity, depending on the specific embodiment of the invention, may be increased by a factor of 40 percent over typical conventional Ziegler-Natta catalysts.

The inventors have discovered, unexpectedly and surprisingly, that when certain combinations of $TiCl_3$, $MgCl_2$, and THF are reacted and then pre-activated for polymerization with alumoxanes alone or with various aluminum alkyls, and subsequently activated with various other aluminum alkyls, either alone or in combination, the resultant catalysts have further enhanced polymerization productivity.

The polymerizations according to the invention may be conducted in slurry or gas phase, as known to those skilled in the art, and may be conducted over a temperature range of 30 to 110° C. The polymers produced using various embodiments of the present invention possess a broad range of molecular weights and distributions, while the process of making the polymers provides for increased productivity. Additionally, the polymers maintain relatively constant bulk properties, e.g. bulk density.

Moreover, the catalyst systems of the invention reduce the quantity of expensive alumoxanes that are required in metallocene systems.

DESCRIPTION OF THE PREFERRED EMBODIMENTS

The supported transition metal based catalyst systems of the present invention are preferably obtained by preparing a precursor containing the reaction product of at least one transition metal compound, at least one alkali earth halide or alkali metal halide complex and an electron donor, and supporting the precursor on an appropriate support and pre-activating the precursor with an aluminoxane or mixtures of aluminoxane and aluminum alkyl.

The precursor contains the reaction product of at least one transition metal compound, one alkali earth halide or alkali metal halide and at least one electron donor (ED) preferably selected from ethers or esters groups.

The precursor can be a solution or supported on appropriate support (e.g., silica). The catalyst is produced by treating the supported precursor with methylalumoxane (MAO) prior to injecting the precursor into the reactor vessel. Preferably, TEAL is used as a co-catalyst and is added to the reactor prior to injection of the catalyst. It is believed this order of operation produces the best recipe for ethylene polymerization.

Support materials include silica, alumina, silica—alumina compound and mixtures thereof, as known by those skilled in the art. The catalysts of the present invention are typically supported with silica supports (preferably pre-treated silica which has been dehydrated and treated with TEAL), either surface modified or not in a manner known to those of ordinary skill in the art of olefin polymerization catalysis. Additionally, other suitable support materials may be employed, for example, finely divided polyethylene or polystyrene. The silica support is substantially dehydrated to minimize the surface hydroxyl group density making the support inert towards the catalyst precursor. Such treatments may be carried out in vacuum or while fluidizing with an inert gas such as nitrogen or argon and the like at a temperature between about 200 to 1000° C., preferably, from 400° C. to 600° C. Such thermal treatment may be for any sufficient length of time but preferably anywhere from 2 to 20 hours. The silica may be chosen as necessary, however, a particularly useful but non-limiting size range is from 1 to 500 microns in diameter.

A ratio of 2 to 10 weight percent of the support material can be used. Support pre-treatment may be carried out at a temperature from 30° C. to the boiling point of the solvent, preferably 40° C. to 60° C., for 2 to 8 hours. A suitable low boiling point hydrocarbon diluent such as hexane, heptane or isopentane and the like may be useful as a slurry medium to accomplish such treatment.

To promote the catalyst productivity, the support material may be suitably modified with organomagnesium and/or organoaluminum compounds such as conventional alkyl aluminums or alkyl magnesium and the like.

The inventive catalyst systems contain at least one transition metal. Illustrative, but non-limiting, examples of useful transition metal precursor compounds include $TiCl_3$, $TiCl_4$, $Ti(OC_2H_5)_3Cl$, $VOCl_3$, $VCl_4$, $ZrCl_4$, $ZrCl_3(OC_2H_5)$ and the like.

The inventive catalyst systems also contain at least one alkali metal compound. Examples of the alkali metal compounds include $CaBr_2$, $CaCl_2$, $MgCl_2$ and $MgBr_2$. $MgCl_2$ is the preferred compound and anhydrous $MgCl_2$ the most preferred. Approximately, 1 to 10 mols of magnesium chloride per mol of the titanium compounds may be used and is preferred.

The inventive catalyst systems also comprise at least one electron donor compound. Illustrative but non-limiting examples of electron donor compounds include aliphatic and aromatic esters, aliphatic ethers, cyclic ethers, and aliphatic ketones. The preferred electron donors include tetrahydrofuran, dioxane, acetone, methyl formate and ethyl ether. The most preferred electron donor compound is tetrahydrofuran. The electron donor compound may be preferably from 2 to 20, and more preferably from about 5 to 15 mols of electron donor per mole of Ti containing compound.

The supported Catalyst precursors are pre-activated with an activator, e.g., alumoxanes, at an activator to Ti molar ratio of up to about 100 to 1, more preferably, about 10 to 1 an most preferably 3 to 1 aluminum to titanium molar ratio. Pre-activation is achieved using a hydrocarbon slurry medium typically at about 15–30° C. with continuous mixing followed by drying at temperatures between about 40° C. to 100° C., and preferably 50° C. to 80° C. to obtain a free-flowing solid. Illustrative but non-limiting examples of the preactivators employed in the present invention include but are not limited to polymeric methyl aluminoxane (MAO), diethyl aluminum chloride, tri n-hexyl aluminum, tri ethyl aluminum and mixtures thereof.

The preactivated catalyst precursor is fed into a suitable reactor under a nitrogen atmosphere, typically in a slurry with an inert hydrocarbon diluent such as hexane, heptane, isopentane, toluene or mineral oil or other HC as known in the art. The cocatalyst (e.g., TEAL) is diluted from about 2 to 40 wt % in a similar hydrocarbon solvent as used to slurry the preactivated catalyst, and subsequently added to the reactor as a solution. The TEAL enhances the alkylation step, alkylates titanium to produce carbon-metal bonds (active sites). Other organoaluminum compounds may also be used as a cocatalyst added to the reactor before the alumoxane pre-treated catalyst. Suitable organoaluminum compounds include triethyl aluminum, diethyl aluminum chloride, trisobutyl aluminum, methyl alumoxane and mixtures thereof. The Al/Ti molar ratio of the system is preferably from 25 to 100, and more/preferably 35 to 75 depending on the specific embodiment. The most preferred range is about 45 to 60. The polymerization reaction is carried out by introducing monomer and hydrogen into the reactor. Preferably, the reaction temperature is between 50° C. to 120° C., more preferably 70° C. to 100° C. and most preferably 80–90° C. The total reactor pressure is from 5 to 30 bar, preferably 7 to 20 bar. Using the invention, the typical catalyst productivity can be 170,000 grams or more of polymer per gram of Ti-containing catalyst.

The typical molecular weight of polyethylene homopolymers obtained in accordance with the present invention vary over a wide range, preferably ranging from 1,000 to 700,000. The polydispersity index (molecular weight distribution) expressed as Mw/Mn can vary from 2.5 to 8. The molecular weight and molecular weight distributions are additionally dependent on the hydrogen concentration, catalyst systems and polymerization temperature used as known to those skilled in the art.

The produced polymer density may vary from about 0.90 to 0.97 gm/cc, depending on the particular embodiment of catalyst and monomer reaction conditions used, or comonomer used. The polymers produced using the catalyst of the present invention have a bulk density of about 0.30 to 0.43 g/cc and preferably about 0.35 to 0.39 g/cc (as measured by an ASTM test), depending on the particular embodiment.

EXAMPLES

The following examples are illustrative of some of the products and methods of making the same falling within the scope of the present invention. They are, of course, not to be considered in any way limitative of the invention. Numerous changes and modifications can be made with respect to the invention.

Catalyst Precursor Preparation

In a round bottom flask, 44 grams of porous silica were dehydrated in a flow of dry nitrogen ($N_2$) at 600° C. After cooling, the silica was slurried with 120 ml hexane at room temperature for 30 minutes under $N_2$ atmosphere using a magnetic stirrer. An amount of 22 ml of triethylaluminum (TEAL) was added and mixed with the slurry for 30 minutes at room temperature, then dried at about 70° C. A dry free-flowing solid of the silica containing 5.7% TEAL was obtained (Chemical A).

In a round bottom flask, 1 g of titanium trichloride ($TiCl_3 \cdot 1/3$ $AlCl_3$) and 1.14 g of anhydrous magnesium chloride ($MgCl_2$) were dissolved in 120 ml of freshly distilled tetrahydrofuran (THF) under continuous refluxing using a magnetic stirrer. The mixture was stirred at a temperature of 65–70° C. for about 2 hrs to form a precursor solution. In another round bottom flask, an amount of 14.6 g of the silica (Chemical A) was slurried in THF before adding the precursor composition for impregnation. The mixture was mixed for about 30 min at a temperature of 50° C. under $N_2$ atmosphere, then dried at about 50–70° C. under very low vacuum. A dry free-flowing solid of the silica impregnated precursor containing 12.7 weight percent of THF was obtained (Chemical B).

Example 1—Comparative 4 grams of Chemical B was slurried with hexane at 30° C. in a roundbottom flask using a magnetic stirrer under a nitrogen blanket. 8.4 ml of a 20% solution of diethyl aluminum chloride (DEAC) in hexane was added to the slurry and mixed at 30° C. for 30 minutes. 3.5 ml of 20% solution of tri-n-hexyl aluminum (TnHAL) in hexane was added to the mixture and mixed at 30° C. for 30 minutes to give a 0.70 Al/THF molar ratio. This mixture was dried for 2 hours at a temperature of about 70° C. to yield a dry free-flowing solid (Catalyst A).

Slurry Homo-Polymerization

Polymerization was performed in the slurry phase in a 2-liter autoclave reactor equipped with magnetic drive agitation, an external water jacket for temperature control, catalyst injection pump and gas feed streams for hydrogen, nitrogen and ethylene. The reactor was baked for 90 minutes at 150° C., and then purged repeatedly with nitrogen. 900 ml of hexane was added into the reactor, followed by about 3 ml of triethylaluminum (TEAL) as a co-catalyst in order to maintain the Al/Ti ratio at about 50. The reactor contents were stirred at 50° C. for 5 min and 0 psig nitrogen pressure. Hydrogen was fed to raise the reactor pressure to 45 psig", and then the pressure in the reactor was increased to 220 psig with ethylene. The temperature of the vessel was raised to 80° C. and 0.24 grams of the Catalyst A (0.06 Mm Ti) was injected into the reactor using the high pressure injection pump. The resultant polymerization was continued for 60 minutes while maintaining the reaction vessel at 85° C. and 220 psig by constant ethylene flow. The resultant polyethylene had a weight average molecular weight of 151,000, a number average molecular weight of 46,000, a molecular weight distribution of 3.3 and bulk density of 0.42 gm/cc. The polymerization activity was 1,033 gm polymer/gm catalyst.

Example 2

4 grams of Chemical B were slurried with hexane at 30° C. under a nitrogen blanket in a roundbottom flask using a magnetic stirrer. 3 ml of 30% solution of methyl aluminoxane (MAO) in toluene was added to the slurry and mixed at room temperature for 30 minutes to give a 0.72 Al/THF molar ratio. This mixture was dried for 2 hours at about 70° C. to provide a dry free-flowing solid (Catalyst B). Polymerization was performed with Catalyst B using the method set forth in Example 1. The resultant polyethylene had a bulk of 0.36 gm/cc. The polymerization activity was 1,396 gm polymer/gm catalyst.

Example 3

4 grams of Chemical B were slurried with hexane at 30° C. under a nitrogen blanket in a roundbottom flask using a magnetic stirrer. 0.78 ml of a 30% solution of MAO in toluene was added to the slurry and mixed at 30° C. for 30 minutes, and 1.55 ml of a 20% solution of tri-n-hexyl aluminum (TnHAL) in hexane was added to the mixture and stirred at 30° C. for 30 minutes to give a 0.47 MAO/THF molar ratio and a 0.23 TnHAL/THF molar ratio. This mixture was dried for 2 hours at a temperature of about 70° C. to provide a dry free-flowing solid (Catalyst C). Polymerization was performed with Catalyst C. as in Example 1.

The resultant polyethylene had a weight average molecular weight of 137,000, a number average molecular weight of 33,500, a molecular weight distribution of 4.1 and bulk density of 0.36 gm/cc. The polymerization activity was 1,291 gm polymer/gm catalyst.

Example 4

4 grams of Chemical B was slurried with hexane at 30° C. under $N_2$ in a roundbottom flask using a magnetic stirrer. 1.55 ml of 30% solution of MAO in toluene was added to the slurry and mixed at 30° C. for 30 minutes, and then 3.11 ml of 20% solution of tri-n-hexyl aluminum (TnHAL) in hexane was added to the mixture and mixed at 30° C. for 30 minutes to give a 0.23 MAO/THF molar ratio and a 0.47 TnHAL/THF molar ratio. This mixture was dried for 2 hours at about 70° C. to provide a dry free-flowing solid (Catalyst D). Polymerization was performed with Catalyst D as in Example 1. The resultant polyethylene had a bulk density of 0.36 gm/cc. The polymerization activity was 1,104 gm/gm catalyst.

Example 5

4 grams of Chemical B was slurried with hexane at 30° C. under $N_2$ in a roundbottom flask using a magnetic stirrer. An amount of 6 ml of 30% solution of MAO in toluene was added to the slurry and mixed at room temperature for 30 minutes to give a 1.44 Al/THF molar ratio. This mixture was dried for 2 hours at about 70° C. to provide a dry free-flowing solid (Catalyst E). Polymerization was performed with Catalyst E as in Example 1 with the exception that 0.12 gm of the catalyst E was injected and a 55 Al/Ti molar ratio was used. The resultant polyethylene had a weight average molecular weight of 116,000, a number average molecular weight of 26,800, a molecular weight distribution of 4.3 and bulk density of 0.35 gm/cc. The polymerization activity was 1,467 gm/gm catalyst.

Example 6

4 grams of Chemical B was slurried with hexane at 30° C. under $N_2$ in a roundbottom flask using a magnetic stirrer. An amount of 6.66 ml of 30% solution of MAO in toluene was added to the slurry and mixed at room temperature for 30 minutes to give a 3.0 Al/THF molar ratio. This mixture was dried for 3 hours at about 70° C. to provide a dry free-flowing solid (Catalyst F). Polymerization was performed with Catalyst F as in Example 1 with the exception that a 29 Al/Ti molar ratio was used. The resultant polyethylene had a weight average molecular weight of 146,000, a number average molecular weight of 34,000, a molecular weight distribution of 4.3 and bulk density of 0.37 gm/cc. The polymerization activity was 859 gm/gm catalyst.

Example 7

4 grams of Chemical B was slurried with hexane at 30° C. under $N_2$ in a roundbottom flask using a magnetic stirrer. An amount of 13.33 ml of 30% solution of MAO in toluene was added to the slurry and mixed at room temperature for 30 minutes to give a 6.0 Al/THF molar ratio. This mixture was dried for 3 hours at about 80° C. to provide a dry free-flowing solid (Catalyst G). Polymerization was performed with Catalyst G as in Example 6. The resultant polyethylene had a weight average molecular weight of 143,000, a number average molecular weight of 31,300, a molecular weight distribution of 4.6 and bulk density of 0.37 gm/cc. The polymerization activity was 1,277 gm/gm catalyst.

Example 8

4 grams of Chemical B was slurried with hexane at 30° C. under $N_2$ in a roundbottom flask using a magnetic stirrer. An amount of 24 ml of 30% solution of MAO in toluene was added to the slurry and mixed at room temperature for 30 minutes to give a 14.37 Al/THF molar ratio. This mixture was dried for 2 hours at a temperature of about 70° C. to provide a dry free-flowing solid (Catalyst H). Polymerization was performed with Catalyst H as in Example 1. The polymerization activity was 208 gm/gm catalyst.

Example 9

4 grams of Chemical B was slurried with hexane at 30° C. under $N_2$ in a roundbottom flask using a magnetic stirrer. 1.5 ml of 30% solution of MAO in toluene was added to the slurry and mixed at room temperature for 30 minutes to give a 0.36 Al/THF molar ratio. This mixture was dried for 2 hours at about 70° C. to provide a dry free-flowing solid (Catalyst I). Polymerization was performed with Catalyst I as in Example 1. The resultant polyethylene had a weight average molecular weight of 120,000, a number average molecular weight of 28,500, a molecular weight distribution of 4.2 and bulk density of 0.38 gm/cc. The polymerization activity was 1,396 gm/gm catalyst.

Example 10

Polymerization was performed with Catalyst I as in Example 1 with the exception that 15 psig hydrogen was fed into the reactor and a temperature of 75–85° C. was employed. The resultant polyethylene had a weight average molecular weight of 611,000, a number average molecular weight of 67,800, a molecular weight distribution of 8.0 and bulk density of 0.36 gm/cc. The polymerization activity was 1,996 gm/gm catalyst.

Example 11

4 grams of Chemical B was slurried with hexane at 30° C. under $N_2$ in a roundbottom flask using a magnetic stirrer. An amount of 0.35 ml of 30% solution of MAO in toluene was added to the slurry and mixed at room temperature for 30 minutes to give a 0.2 Al/THF molar ratio. This mixture was dried for 2 hours at about 70° C. to provide a dry free-flowing solid (Catalyst J). Polymerization was performed with Catalyst J as in Example 1. The resultant polyethylene had a weight average molecular weight of 102,000, a number average molecular weight of 23,100, a molecular weight distribution of 4.4 and bulk density of 0.39 gm/cc. The polymerization activity was 1,942 gm/gm catalyst.

Example 12

4 grams of Chemical B was slurried with hexane at 30° C. under $N_2$ in a roundbottom flask using a magnetic stirrer. 0.22 ml of 30% solution of MAO in toluene was added to the slurry and mixed at room temperature for 30 minutes to give a 0.1 Al/THF molar ratio. This mixture was dried for 2 hours at about 70° C. to provide a dry free-flowing solid (Catalyst K). Polymerization was performed with Catalyst K as in Example 1. The resultant polyethylene had a weight average molecular weight of 110,000, a number average molecular weight of 27,000, a molecular weight distribution of 4.2 and bulk density of 0.38 gm/cc. The polymerization activity was 1,359 gm/gm catalyst.

Example 13—Comparative 4 grams of Chemical B was slurried with hexane at 30° C. under $N_2$ in a roundbottom flask using a magnetic stirrer. 2.5 ml of 20% solution of diethyl aluminum chloride (DEAC) in hexane was added to the slurry and mixed at 30° C. for 30 minutes. An amount of 1.75 ml of 20% solution of tri-n-hexyl aluminum (TnHAL) in hexane was then added to the mixture and mixed at 30° C. for 30 minutes to give a 0.25 Al/THF molar ratio. This mixture was dried for 2 hours at about 70° C. to provide a dry free-flowing solid (Catalyst L).

Polymerization was performed with Catalyst L identically as in Example 1. The resultant polyethylene had a bulk density of 0.38 gm/cc. The polymerization activity was 1,150 gm/gm catalyst.

Example 14—Comparative 4 grams of Chemical B was slurried with hexane at 30° C. under $N_2$ in a roundbottom flask using a magnetic stirrer. An amount of 1.7 ml of 20% solution of diethyl aluminum chloride (DEAC) in hexane was added to the slurry and mixed at 30° C. for 30 minutes. An amount of 3.5 ml of 20% solution of tri-n-hexyl aluminum (TnHAL) in hexane was then added to the mixture and mixed at 300° C. for 30 minutes to give a 0.30 Al/THF molar ratio. This mixture was dried for 2 hours at about 70° C. to provide a dry free-flowing solid (Catalyst M).

Slurry Co-Polymerization

Polymerization was performed in the slurry phase in a 2-liter autoclave reactor equipped with magnetic drive agitation, an external water jacket for temperature control, a catalyst injection pump and gas feed streams (hydrogen, nitrogen and ethylene). The reactor was heated for 90 minutes at 150° C., and then pressurized and depressurized with $N_2$ several times. 900 ml of hexane was added into the reactor, followed by about 3 ml of triethylaluminum (TEAL) as a co-catalyst to maintain a Al/Ti ratio of about 53. The reactor contents were stirred at 50° C. for 5 min and 0 psig nitrogen pressure. 10 ml of hexene-1 was injected after the TEAL solution. Hydrogen was fed to increase the reactor pressure to 45 psi". The reactor was then pressurized to 220 psig with ethylene. The reaction vessel temperature was then raised to 80° C. An amount 0.09 gm of the Catalyst M (0.02 Mm Ti) was injected into the reactor using the high pressure injection pump. The polymerization was continued for 60 minutes while maintaining the reaction vessel at 850° C. and 220 psig with constant ethylene flow. 270 grams of polyethylene was recovered. The polyethylene had a branching frequency of 0.5 per 1000 C atoms, hexene-1 of 0.09% mole and a density of 0.9560 gm/cc. The polymerization activity was 3,000 gm/gm catalyst.

Example 15

Polymerization was performed with Catalyst J (Example 11) as in Example 13. The resultant polyethylene had a branching frequency of 0.4 per 1000 C atoms, hexene-1 of 0.08% mole and a density of 0.9548 gm/cc. The polymerization activity was 3,500 gm/gm catalyst.

Example 16

Polymerization was performed with Catalyst I (Example 9) as in Example 13. The resultant polyethylene had a branching frequency of 0.4 per 1000 C atoms, hexene-1 of 0.08% mole and a density of 0.9556 gm/cc. The polymerization activity was 4,225 gm/gm catalyst.

Example 17—Comparative

Polymerization was performed employing Catalyst M (Example 14) as in Example 13 with the exception that 20 ml of hexene-1 was injected into the reactor. The resultant polyethylene had a branching frequency of 0.7 per 1000 C atoms, hexene-1 of 0.14% mole and a density of 0.9534 gm/cc. The polymerization activity was 3,211 gm/gm catalyst.

Example 18

Polymerization was performed with Catalyst J (Example 11) as in Example 13 with the exception that 20 ml of hexene-1 was injected into the reactor. The resultant polyethylene had a branching frequency of 0.17 per 1000 C atoms, hexene-1 of 0.14% mole and a density of 0.9540 gm/cc. The polymerization activity was 4,063 gm/gm catalyst.

Example 19

Polymerization was performed with Catalyst I (Example 9) as in Example 13 with the exception that 20 ml of hexene-1 was injected into the reactor. The resultant polyethylene had a branching frequency of 0.6 per 1000 C atoms, hexene-1 of 0.12% mole and a density of 0.9524 gm/cc. The polymerization activity was 3,750 gm/gm catalyst.

Example 20—Comparative

Polymerization was performed employing Catalyst M (Example 14) as in Example 13 with the exception that 30 ml of hexene-1 was injected into the reactor. The resultant polyethylene had a branching frequency of 1.4 per 1,000 C atoms, hexene-1 of 0.28% mole and a density of 0.9518 gm/cc. The polymerization activity was 3,422 gm/gm catalyst.

Example 21

Polymerization was performed with Catalyst J (Example 11) as in Example 13 with the exception that 30 ml of hexene-1 was injected into the reactor. The resultant polyethylene had a branching frequency of 1.2 per 1,000 C atoms, hexene-1 of 0.23% mole and a density of 0.9492 gm/cc. The polymerization activity was 3,888 gm/gm catalyst.

Example 22

Polymerization was performed with Catalyst I (Example 9) as in Example 13 with the exception that 30 ml of hexene-1 was injected into the reactor. The resultant polyethylene had a branching frequency of 1.10 per 1,000 C atoms, hexene-1 of 0.19% mole and a density of 0.9506 gm/cc. The polymerization activity was 3,938 gm/gm catalyst.

Example 23—Comparative

Polymerization was performed employing Catalyst M (Example 14) as in Example 13 with the exception that 60 ml of hexene-1 was injected into the reactor. The resultant polyethylene had a branching frequency of 2.7 per 1,000 C atoms, hexene-1 of 0.54% mole and a density of 0.9464 gm/cc. The polymerization activity was 2,733 gm/gm catalyst.

Example 24

Polymerization was performed with Catalyst J (Example 11) as in Example 13 with the exception that 60 ml hexene-1 was injected into the reactor. The resultant polyethylene had a branching frequency of 1.7 per 1,000 C atoms, hexene-1 of 0.33% mole and a density of 0.9484 gm/cc. The polymerization activity was 4,313 gm/gm catalyst.

Example 25

Polymerization was performed with Catalyst I (Example 9) as in Example 13 with the exception that 60 ml of hexene-1 was injected into the reactor. The resultant polyethylene had a branching frequency of 1.7 per 1,000 C atoms, hexene-1 of 0.34% mole and a density of 0.9478 gm/cc. The polymerization activity was 4,288 gm/gm catalyst.

Example 26—Comparative

Polymerization was performed employing Catalyst M (Example 14) as in Example 13 with the exception that 80 ml of hexene-1 was injected into the reactor. The resultant polyethylene had a branching frequency of 2.9 per 1,000 C atoms, hexene-1 of 0.57% mole and a density of 0.9424 gm/cc. The polymerization activity was 2,833 gm/gm catalyst.

Example 27

Polymerization was performed with Catalyst J (Example 11) as in Example 13 with the exception that 80 ml of hexene-1 was injected into the reactor. The resultant polyethylene had a branching frequency of 2.2 per 1,000 C atoms, hexene-1 of 0.57% mole and a density of 0.9454 gm/cc. The polymerization activity was 3,950 gm/gm catalyst.

Example 28

Polymerization was performed with Catalyst I (Example 9) as in Example 13 with the exception that 80 ml of hexene-1 was injected into the reactor. The resultant polyethylene had a branching frequency of 2.6 per 1,000 C atoms, hexene-1 of 0.52% mole and a density of 0.9442 gm/cc. The polymerization activity was 4,538 gm/gm catalyst.

TABLE I

Reaction Conditions For Examples 1 to 13

| Example | Activator | Activators Ratio | Catalyst (gm) | Al/THF | Total Al/Ti | Temp °C. | Yield gm | Activity gm/gm | Bulk density gm/cc | Mw | MWD |
|---|---|---|---|---|---|---|---|---|---|---|---|
| 1* | DEAC/TnHAL | 0.50/0.20 | 0.24 | 0.70 | 50 | 85 | 248 | 1033 | 0.42 | 151000 | 3.3 |
| 2 | MAO | | 0.24 | 0.72 | 50 | 85 | 335 | 1396 | 0.36 | — | — |
| 3 | MAO/TnHAL | 0.47/0.23 | 0.24 | 0.70 | 50 | 85 | 310 | 1291 | 0.36 | 137000 | 4.1 |
| 4 | MAO/TnHAL | 0.23/0.47 | 0.24 | 0.70 | 55 | 85 | 265 | 1104 | 0.37 | — | — |
| 5 | MAO | | 0.12 | 1.44 | 55 | 85 | 176 | 1467 | 0.35 | 116000 | 4.3 |
| 6 | MAO | | 0.22 | 3.00 | 29 | 85 | 189 | 859 | 0.37 | 146000 | 4.3 |
| 7 | MAO | | 0.22 | 6.00 | 29 | 85 | 281 | 1277 | 0.37 | 143000 | 4.6 |
| 8 | MAO | | 0.24 | 14.37 | 50 | 85 | 50 | 208 | — | — | — |
| 9 | MAO | | 0.24 | 0.36 | 53 | 85 | 335 | 1396 | 0.38 | 120000 | 4.2 |
| 10 | MAO | | 0.24 | 0.36 | 53 | 75 | 479 | 1996 | 0.36 | 611000 | 8.0 |
| 11 | MAO | | 0.24 | 0.20 | 53 | 85 | 466 | 1942 | 0.39 | 102000 | 4.4 |
| 12 | MAO | | 0.22 | 0.10 | 55 | 85 | 298 | 1355 | 0.38 | 110000 | 4.2 |
| 13* | DEAC/TnHAL | 0.15/0.1 | 0.24 | 0.25 | 55 | 85 | 276 | 1150 | 0.38 | — | — |

*Comparative Example

TABLE II

Reaction Conditions For Examples 14 to 28

| Example | Activator | Activators Ratio | Catalyst gm. | Al/THF | Hexene-1 mc | Total Al/ti | Temp. °C. | Yield gm | Activity gm/gm | Density gm/cc | Branch Frequency/ 1000 C. | Hexene mole % |
|---|---|---|---|---|---|---|---|---|---|---|---|---|
| 14* | DEAC/TnHAL | 0.10/0.20 | 0.09 | 0.30 | 10 | 53 | 85 | 270 | 3000 | 0.9560 | 0.5 | 0.09 |
| 15 | MAO | | 0.08 | 0.20 | 10 | 53 | 85 | 280 | 3500 | 0.9548 | 0.4 | 0.08 |
| 16 | MAO | | 0.08 | 0.36 | 10 | 53 | 85 | 338 | 4225 | 0.9556 | 0.4 | 0.08 |
| 17 | DEAC/TnHAL | 0.10/0.20 | 0.09 | 0.30 | 20 | 53 | 85 | 289 | 3211 | 0.9534 | 0.7 | 0.14 |
| 18 | MAO | | 0.08 | 0.20 | 20 | 53 | 85 | 325 | 4063 | 0.9540 | 0.7 | 0.14 |
| 19 | MAO | | 0.08 | 0.36 | 20 | 53 | 85 | 300 | 3750 | 0.9524 | 0.6 | 0.12 |
| 20 | DEAC/TnHAL | 0.10/0.20 | 0.09 | 0.30 | 30 | 53 | 85 | 308 | 3422 | 0.9518 | 1.4 | 0.28 |
| 21 | MAO | | 0.08 | 0.20 | 30 | 53 | 85 | 311 | 3888 | 0.9492 | 1.2 | 0.23 |
| 22 | MAO | | 0.08 | 0.36 | 30 | 53 | 85 | 315 | 3938 | 0.9506 | 1.0 | 0.19 |
| 23* | DEAC/TnHAL | 0.10/0.20 | 0.09 | 0.30 | 60 | 53 | 85 | 246 | 2733 | 0.9464 | 2.7 | 0.54 |
| 24 | MAO | | 0.08 | 0.20 | 60 | 53 | 85 | 345 | 4313 | 0.9484 | 1.7 | 0.33 |
| 25 | MAO | | 0.08 | 0.36 | 60 | 53 | 85 | 343 | 4288 | 0.9478 | 1.7 | 0.34 |
| 26* | DEAC/TnHAL | 0.10/0.20 | 0.09 | 0.30 | 80 | 53 | 85 | 255 | 2833 | 0.9424 | 2.9 | 0.57 |
| 27 | MAO | | 0.08 | 0.20 | 80 | 53 | 85 | 316 | 3950 | 0.9454 | 2.2 | 0.57 |
| 28 | MAO | | 0.08 | 0.36 | 80 | 53 | 85 | 363 | 4538 | 0.9442 | 2.6 | 0.52 |

*Comparative Example

Referring to Table I, Examples 1–4 show that using MAO as an activator (Example 2) instead of using DEAC/TnHAL (Example 1) leads to an increase in the activity by 26% accompanied with a decrease in the bulk density by 14.3%. Using (MAO/TnHAL) (Examples 3 and 4) as an activator instead of DEAC/TnHAL also leads to an increase in activity by 20% and an increase in MWD by 20%.

Examples 5–12 show that increasing the Activator/THF molar ratio from 0.1 up to 0.36 leads to an increase in the catalyst activity by 47%, after which the activity decreased with further increase in the activator/THF molar ratio. The increase in activity was about 32% when the Activator/THF molar ratio increased from 0.1 to 0.36. Also, MWD increased by 47% when the Activator/THF molar ratio increased from 0.1 to 0.36. The activity decreased significantly by about 90% when the Activator/THF molar ratio further increased from 0.36 up to 14.37. MWD decreased by 43% with further increase in Activator/THF molar ratio from 0.36 to 6.00.

Referring to Table II, Examples 14, 17, 20, 23 and 26 show that when using DEAC/TnHAL as an activator, the activity of the catalyst increased by 12% when the amount of hexene-1 comonomer increased from 10 ml to 30 ml, after which the activity decreased and remained constant with further increase in the comonomer concentration.

When using MAO as the activator for the catalyst (Examples 15, 16, 18, 19, 21, 22, 24, 25, 27 and 28), activity increased gradually by increasing the concentration of hexene-1 comonomer wherein the activity increased by 19% when the hexene-1 concentration increased from 10 to 60 ml.

An increase in the hexene-1 comonomer concentration when using DEAC/TnHAL as an activator caused a sharp decrease in the density of the produced polymer wherein the density decreased from 0.9560 to 0.9424 when the hexene concentration increased from 10 to 80 ml.

On the other hand, an increase in the hexene-1 concentration when using MAO as an activator caused a gradual decrease in the density of the produced polymer wherein the density decreased from 0.9548 to 0.9454.

An increase in the hexene comonomer concentration when using DEAC/TnHAL as an activator led to a significant increase in the hexene % content in the produced polymer. Hexene % increased from 0.09 mol % to 0.54 mol % at 10 and 60 ml of hexene, respectively.

Increasing hexene concentration while using MAO caused a gradual increase in the hexene % content in the produced polymer wherein the hexene % increased from 0.08 mol % to 0.33 mol % at 10 and 60 ml of hexene, respectively.

As can be seen by the Examples, using MAO as an activator during the catalyst preparation process increases the catalyst activity in general, the incorporation of the comonomer and the MWD of the produced polymer.

The above description of the invention is intended to be illustrative and not limiting. Various changes or modifications in the embodiments described may occur to those skilled in the art. These can be made without departing from the spirit or scope of the invention.

We claim:

1. A solid supported Ziegler-Natta transition-metal based catalyst precursor made by the process comprising the step of reacting the following components to form a precursor component:
    (a) at least one transition metal compound, said transition metal selected from the group consisting of titanium, vanadium and zirconium;
    (b) at least one metal halide complex selected from the group consisting of $MgCl_2$, $MgBr_2$, $CaBr_2$, and $CaCl_2$;
    (c) at least one organic electron donor compound selected from the group consisting of tetrahydrofuran, dioxane, acetone, methyl formate, and ethyl ether; and
    (d) an effective amount of an alumoxane compound, wherein said alumoxane compound comprises methylalumoxane,
    wherein said precursor component is impregnated onto a support to form said solid supported Ziegler-Natta transition-metal based catalyst precursor.

2. The solid supported Ziegler-Natta transition-metal based catalyst precursor of claim 1, wherein the molar ratio of aluminum from said alumoxane compound to said organic electron donor compound is from about 0.1 to 15.

3. The solid supported Ziegler-Natta transition-metal based catalyst precursor of claim 1, wherein the molar ratio of aluminum from said alumoxane compound to said organic electron donor compound is from 0.2 to 0.4.

4. The solid supported Ziegler-Natta transition-metal based catalyst precursor of claim 3, wherein said organic electron donor compound is tetrahydrofuran.

5. The solid supported Ziegler-Natta transition-metal based catalyst precursor of claim 1, wherein the transition metal comprises titanium and the aluminum to titanium molar ratio is from about 0.1 to 10.

6. The solid supported Ziegler-Natta transition-metal based catalyst precursor of claim 2, wherein the transition metal comprises titanium and the aluminum to titanium molar ratio is from about 0.1 to 10.

7. The solid supported Ziegler-Natta transition-metal based catalyst precursor of claim 3, wherein the transition metal comprises titanium and the aluminum to titanium molar ratio is from about 0.1 to 10.

8. The solid supported Ziegler-Natta transition-metal based catalyst precursor of claim 1, wherein the transition metal comprises titanium and the aluminum to titanium molar ratio is from about 0.7 to 6.0.

9. The solid supported Ziegler-Natta transition-metal based catalyst precursor of claim 2, wherein the transition metal comprises titanium and the aluminum to titanium molar ratio is from about 0.7 to 6.0.

10. The solid supported Ziegler-Natta transition-metal based catalyst precursor of claim 3, wherein the transition metal 1 comprises titanium and the aluminum to titanium molar ratio is from about 0.7 to 6.0.

11. The solid supported Ziegler-Natta transition-metal based catalyst precursor of claim 1, wherein the transition metal comprises titanium and the total ratio of aluminum to titanium is from about 10 to about 150 and further comprising an activator compound selected from the group consisting of methyl alumoxane, triethyl aluminum, tri n-hexyl aluminum, diethyl aluminum chloride, trimethyl aluminum and mixtures thereof.

12. The solid supported Ziegler-Natta transition-metal based catalyst precursor of claim 1, wherein the transition metal comprises titanium and the at least one metal halide complex comprises magnesium and the ratio of magnesium to titanium is from 0.5 to 10.

13. The solid supported Ziegler-Natta transition-metal based catalyst precursor of claim 1, wherein said support is selected from the group consisting of silica, silica-alumina, alumina and mixtures thereof.

14. The solid supported Ziegler-Natta transition-metal based catalyst precursor of claim 1, wherein said catalyst precursor is supported onto pretreated silica.

15. A process for polymerizing olefin monomers comprising:
(a) adding to a polymerization reactor a hydrocarbon solution of an organoaluminum compound selected from the group consisting of triethyl aluminum, diethyl aluminum chloride, trisobutyl aluminum, methyl alumoxane and mixtures thereof;
(b) introducing olefinic monomers into said polymerization reactor;
(c) adding the supported olefin catalyst precursor of claim 1 into said reactor; and
(d) polymerizing said monomers at a temperature of between 40 and 110 degrees C. and a total pressure of between 10 and 30 bar.

16. The process of claim 15, wherein said monomer is selected from the group consisting of ethylene, propylene, butene, hexen and mixtures thereof.

17. The process of claim 15, wherein the molar ratio of aluminum from said alumoxane compound to said organic electron donor compound is from about 0.2 to about 0.4.

18. The process of claim 15, wherein the transition metal comprises titanium and the productivity for the polymerization of monomer is greater than 97,000 grams of polymer per gram of Ti in the catalyst composition.

19. A method of making a solid supported Ziegler-Natta transition-metal based catalyst precursor comprising the steps of reacting the following components to form a precursor component:
(a) at least one transition metal compound, said transition metal selected from the group consisting of titanium, vanadium, and zirconium;
(b) at least one metal halide complex selected from the group consisting of $MgCl_2$, $MgBr_2$, $CaBr_2$, and $CaCl_2$;
(c) at least one organic electron donor compound selected from the group consisting of tetrahydrofuran, dioxane, acetone, methyl formate, and ethyl ether; and
(d) an effective amount of an alumoxane compound, said alumoxane compound comprising methylalumoxane,
wherein said precursor component is impregnate onto a support to form said solid supported Ziegler-Natta transition-metal based catalyst precursor.

20. The method of claim 19, wherein the molar ratio of aluminum from said alumoxane compound to said organic electron donor compound is from about 0.1 to 15.

21. The method of claim 19, wherein the molar ratio of aluminum from said alumoxane compound to said organic electron donor compound is from 0.2 to 0.4.

22. The method of claim 19, wherein said organic electron donor compound comprises tetrahydrofuran.

23. The method of claim 19, wherein said reacting comprises the steps of forming a first solution comprising said support, said transition metal compound, said metal halide complex, and said organic electron donor compound and then mixing the first solution with a second solution comprising said effective amount of said alumoxane compound.

24. A solid supported Ziegler-Natta transition-metal based catalyst precursor made by the method of claim 19.

25. The solid supported Ziegler-Natta transition-metal based catalyst precursor of claim 1, wherein said alumoxane compound consists essentially of methylalumoxane.

26. The method of claim 19, wherein said alumoxane compound consists essentially of methylalumoxane.

27. A solid preactivated Ziegler-Natta transition-metal based catalyst precursor made by the process comprising:
(a) forming a precursor component comprising:
(i) at least one transition metal compound, said transition metal selected from the group consisting of titanium, vanadium, and zirconium;
(ii) at least one metal halide complex selected from the group consisting of $MgCl_2$, $MgBr_2$, $CaBr_2$, and $CaCl_2$; and
(iii) at least one organic electron donor compound selected from the group consisting of tetrahydrofuran, dioxane, acetone, methyl formate, and ethyl ether; and
(b) preactivating said precursor component with an effective amount of methylalumoxane thereby forming said solid preactivated Ziegler-Natta transition-metal based catalyst precursor.

28. A method of forming a solid preactivated Ziegler-Natta transition-metal based catalyst precursor comprising:
(a) forming a precursor component comprising:
(i) at least one transition metal compound, said transition metal selected from the group consisting of titanium, vanadium, and zirconium;
(ii) at least one metal halide complex selected from the group consisting of $MgCl_2$, $MgBr_2$, $CaBr_2$, and $CaCl_2$; and
(iii) at least one organic electron donor compound selected from the group consisting of tetrahydrofuran, dioxane, acetone, methyl formate, and ethyl ether; and (b) preactivating said precursor component with an effective amount of methylalumoxane thereby forming said solid preactivated Ziegler-Natta transition-metal based catalyst precursor.

29. A Ziegler-Natta transition-metal based catalyst made by the process comprising:

(a) forming a precursor component comprising:
  (i) at least one transition metal compound, said transition metal selected from the group consisting of titanium, vanadium, and zirconium;
  (ii) at least one metal halide complex selected from the group consisting of $MgCl_2$, $MgBr_2$, $CaBr_2$, and $CaCl_2$; and
  (iii) at least one organic electron donor compound selected from the group consisting of tetrahydrofuran, dioxane, acetone, methyl formate, and ethyl ether;

(b) preactivating said precursor component with an effective amount of methylalumoxane thereby forming a solid preactivated Ziegler-Natta transition-metal based catalyst precursor; and (c) fully activating said solid preactivated Ziegler-Natta transition-metal based catalyst precursor thereby forming said Ziegler-Natta transition-metal based catalyst.

30. A method of making a Ziegler-Natta transition-metal based catalyst comprising:

(a) forming a precursor component comprising:
  (i) at least one transition metal compound, said transition metal selected from the group consisting of titanium, vanadium, and zirconium;
  (ii) at least one metal halide complex selected from the group consisting of $MgCl_2$, $MgBr_2$, $CaBr_2$, and $CaCl_2$; and
  (iii) at least one organic electron donor compound selected from the group consisting of tetrahydrofuran, dioxane, acetone, methyl formate, and ethyl ether;

(b) preactivating said precursor component with an effective amount of methylalumoxane thereby forming a solid preactivated Ziegler-Natta transition-metal based catalyst precursor; and (c) fully activating said solid preactivated Ziegler-Natta transition-metal based catalyst precursor thereby forming said Ziegler-Natta transition-metal based catalyst.

31. The Ziegler-Natta transition-metal based catalyst of claim 29, wherein said step of fully activating is in the presence of an activator selected from the group consisting of alumoxanes, aluminum alkyl-type transition metal polymerization activators and combinations thereof.

32. The method of claim 30, wherein said step of fully activating is in the presence of an activator selected from the group consisting of alumoxanes, aluminum alkyl-type transition metal polymerization activators, and combinations thereof.

33. The solid preactivated Ziegler-Natta transition-metal based catalyst precursor of claim 27, wherein said catalyst precursor is supported on a catalyst support.

34. The solid preactivated Ziegler-Natta transition-metal based catalyst precursor of claim 33, wherein said support is selected from the group consisting of silica, silica-alumina, alumina, and mixtures thereof.

35. The method of claim 28, wherein said catalyst precursor is supported on a catalyst support.

36. The method of claim 35, wherein said support is selected from the group consisting of silica, silica-alumina, alumina, and mixtures thereof.

37. The Ziegler-Natta transition-metal based catalyst of claim 29, wherein said catalyst is supported on a catalyst support.

38. The Ziegler-Natta transition-metal based catalyst of claim 37, wherein said support is selected from the group consisting of silica, silica-alumina, alumina, and mixtures thereof.

39. The method of claim 30, wherein said catalyst is supported on a catalyst support.

40. The method of claim 39, wherein said support is selected from the group consisting of silica, silica-alumina, alumina, and mixtures thereof.

41. The solid preactivated Ziegler-Natta transition-metal based catalyst precursor of claim 27, wherein said catalyst precursor is supported onto pretreated silica.

42. The method of claim 28, wherein said catalyst precursor is supported onto pretreated silica.

43. The Ziegler-Natta transition-metal based catalyst of claim 29, wherein said catalyst is supported onto pretreated silica.

44. The method of claim 30, wherein said catalyst is supported onto pretreated silica.

45. The solid preactivated Ziegler-Natta transition-metal based catalyst precursor of claim 27, wherein the molar ratio of aluminum from said alumoxane compound to said organic electron donor compound is from about 0.1 to 15.

46. The solid preactivated Ziegler-Natta transition-metal based catalyst precursor of claim 27, wherein the molar ratio of aluminum from said alumoxane compound to said organic electron donor compound is from 0.2 to 0.4.

47. The solid preactivated Ziegler-Natta transition-metal based catalyst precursor of claim 27, wherein said organic electron donor compound is tetrahydrofuran.

48. The solid preactivated Ziegler-Natta transition-metal based catalyst precursor of claim 27, wherein the transition metal comprises titanium and the aluminum to titanium molar ratio is from about 0.1 to 10.

49. The solid preactivated Ziegler-Natta transition-metal based catalyst precursor of claim 27, wherein the transition metal comprises titanium and the aluminum to titanium molar ratio is from about 0.7 to 6.0.

50. The solid preactivated Ziegler-Natta transition-metal based catalyst precursor of claim 27, wherein the transition metal comprises titanium and the at least one metal halide complex comprises magnesium and the ratio of magnesium to titanium is from 0.5 to 10.

51. The method of claim 28, wherein said forming said precursor component comprises forming a first solution comprising a support, said transition metal compound, said metal halide complex and said organic electron donor compound and said preactivating comprises mixing the first solution with a second solution comprising said effective amount of said alumoxane compound.

52. The solid preactivated Ziegler-Natta transition-metal based catalyst precursor of claim 27, wherein said catalyst precursor is capable of providing a catalyst productivity of at least 170,000 grams polymer per gram of catalyst.

53. The method of claim 28, wherein said preactivating is in a hydrocarbon slurry medium at a temperature of about 15–30° C.

54. The method of claim 30, wherein said preactivating in a hydrocarbon slurry medium at a temperature of about 15–30° C.

55. The method of claim 29, further comprising the step of drying said solid preactivated Ziegler-Natta transition-metal based catalyst precursor to obtain a free-flowing solid.

56. The method of claim 55, wherein said drying is at a temperature between about 40° C. to 100° C.